2,927,084
LAUROYL PEROXIDE COMPOSITIONS

Allan A. Wahl, Olcott, N.Y., assignor to Cadet Chemical Corporation, Burt, N.Y., a corporation of New York No Drawing. Application August 12, 1957
Serial No. 677,762

11 Claims. (Cl. 252—426)

The present invention relates to a method for making a paste containing lauroyl peroxide from which paste the lauroyl peroxide is easily soluble in resins and monomers for their polymerization. Pure lauroyl peroxide is not easily dissolved although soluble in such systems.

It has been known for some time that a straight chain aliphatic peroxide like lauroyl peroxide when added to a vinyl monomer or polyester resin yields a polymer of better light stability than when an aromatic peroxide such as benzoyl peroxide is employed. Commercial lauroyl peroxide is marketed as a solid, white granular material. When mixed into any of the various polyester resins available to the plastics manufacturer, lauroyl peroxide required considerable stirring to get it to dissolve completely in the resin. Some users dissolve the lauroyl peroxide in benzene, then add the benzene solution to the resin but the two flammable materials are potentially hazardous to use and handle. Other users have requested manufacturers to supply finely divided lauroyl peroxide, but even powdered peroxide need quite some stirring and time to dissolve.

It is an object of the present invention to provide a method of making a lauroyl peroxide product which imparts improved solubility characteristics to its contained lauroyl peroxide, particularly in resins and monomers.

It is also an object of the invention to provide a composition of materials such that the organic peroxide will have the same order of stability as the pure lauroyl peroxide. This composition can then be stored and handled with even greater safety than the pure peroxide.

It is likewise an object of the invention to provide a uniform paste which consists essentially of lauroyl peroxide and an extender, and is characterized by low vapor pressure, low flammability, slow evaporation rate, and good color stability in storage coupled with non-lumping and nonhardening properties. The extender necessarily must be substantially non-reactive with the peroxide.

In accordance with the present invention such a novel paste, in which surprisingly, the lauroyl peroxide becomes conditioned by a markedly more rapid solubility in polyester resins and monomers is prepared by melting the peroxide in one or a blend of certain liquid extenders and cooling the resulting liquid blend while stirring so as to give a smooth paste-like product. The liquids are plasticizers of the phthalate and phosphate ester type which are liquid at temperatures of from approximately 0 to 40° C. Within this temperature range of from approximately 0 to 40° C. the plasticizer is liquid from the time the lauroyl peroxide becomes molten on heating and the mixture thereafter remains a semi-liquid or paste down to below normal room temperature. It has been found that for the most practical uses about 10 to 50% of lauroyl peroxide gives smooth, stable paste mixture and 25 to 40% lauroyl peroxide content is the preferred amount. The lauroyl peroxide in the paste can be either dry or wet. Some plasticizers of the phthalate and phosphate ester types tested and found applicable are dimethyl phthalate, dibutyl phthalate, dioctyl phthalate, dinonyl phthalate, tributyl phosphate, cresyl diphenyl phosphate and tricresyl phosphate.

The following examples are intended to illustrate the practice of the invention:

Example I

Into 50 ml. beakers there was separately weighed 20 grams each of dimethyl phthalate, dibutyl phthalate, dioctyl phthalate, dinonyl phthalate, tributyl phosphate, cresyl diphenyl phosphate, and tricresyl phosphate. Then 6.4 grams of granular lauroyl peroxide was added to each of the liquid esters in the beakers. After stirring thoroughly the mixtures were allowed to stand several hours and examined. Little or no dispersion, softening or solubilization had taken place. The original lauroyl peroxide had an active oxygen content of 3.88%. Each mixture represented a 23.43% lauroyl peroxide content.

When any one of the above mixtures was added at the rate of 0.8 gram (representing 0.937% lauroyl peroxide) to 20 grams of a polyester resin, the solubility of the peroxide thus introduced was only slightly better than that noted when the same amount of the granular lauroyl peroxide per se was introduced. At least 30 minutes stirring was required to get all the catalyst in solution.

Example II

Into 50 ml. beakers, there was separately weighed, 20 grams each of the liquid esters as given in Example I. Each was heated on a hot plate to 60–70° C., then 6.4 grams of the granular lauroyl peroxide was added and stirred thoroughly. The mixture was again heated and stirred until the peroxide had completely melted. This mixture was now cooled and stirred continually until 30° C. or lower had been attained. The resulting product was a smooth well dispersed material which showed no separation on standing overnight. Each was a 23.43% mixture of lauroyl peroxide.

When any one of the mixtures was added at the rate of 0.8 gram to 20 grams of a polyester resin, the ease of solubility was remarkably improved over that of the granular lauroyl peroxide or the mixtures of Example I. About 15 seconds stirring gave complete solubility. SPI gel and exotherm curves were normal.

Example III

In the same way as given in Example II, 31.35% mixtures from 9.6 grams granular lauroyl peroxide and 20 grams of liquid were prepared. Excellent products and solubility resulted. Exactly 0.6 gram of the 31.35% mixtures were added as catalysts to 20 grams of the polyester resin.

Example IV

The method of Example II was used to prepare 37.36% mixtures from 12.6 grams granular lauroyl peroxide and 20 grams of liquid. Excellent products and solubility resulted. Exactly 0.5 gram of the 37.36% mixtures were added as catalysts to 20 grams of the polyester resin.

Example V

The method of Example II was used to prepare 46.86% mixtures from 18.8 grams granular lauroyl peroxide and 20 grams of liquid in 100 ml. beakers. Stiff end products resulted which contained small hard lumps. In testing the solubility in polyester resins the ease of solubility was not as good as the 23.43 to 37.36% mixtures yet was much improved over the granular lauroyl peroxide. A 0.4 gram amount of the 46.86% mixtures was added to 20 grams of the resin in this case.

The foregoing examples are illustrative of the invention but are not intended to exhaust the broad scope thereof.

I claim:

1. The method of making a paste containing lauroyl peroxide conditioned to dissolve rapidly when added to a polymerizable polyester resin or monomer which comprises mixing lauroyl peroxide with between about one and about nine times its weight of a plasticizer of the group consisting of completely esterified phthalates and phosphates which are substantially inert towards lauroyl peroxide and liquid at temperatures between about 0° C. and about 40° C., heating the said mixture to a temperature above that at which the lauroyl peroxide melts but below about 70° C. until the lauroyl peroxide is completely melted, then cooling the agitated mixture to a temperature below 40° C., thereby forming a paste wherein the lauroyl peroxide, in extremely finely divided form, is uniformly distributed.

2. The method set forth in claim 1 wherein the plasticizer is a dialkyl phthalate in which the esterifying alkyl radicals contain less than ten carbon atoms.

3. The method set forth in claim 1 wherein the plasticizer is a completely esterified organic phosphate wherein the esterifying radicals are members of the group consisting of alkyl and mononuclear hydrocarbon aryl radicals.

4. A conditioned paste containing lauroyl peroxide from which paste the lauroyl peroxide is rapidly soluble in polymerizable polyester resins and monomers preparatory to their polymerization consisting essentially of said lauroyl peroxide uniformly mixed with from about one to about nine times its weight of a plasticizer for the polymerization product selected from the group consisting of completely esterified phthalates and phosphates which are liquid at temperatures below about 40° C. and substantially inert to lauroyl peroxide, said paste being obtainable by heating a mixture of lauroyl peroxide and the selected proportioned amount of a plasticizer of the group hereinbefore defined to a temperature above the melting point of the lauroyl peroxide but below about 70° C., until the lauroyl peroxide is completely melted, then cooling the agitated mixture to a temperature below 40° C.

5. A conditioned paste containing lauroyl peroxide from which paste the lauroyl peroxide is rapidly soluble in polymerizable resins and monomers, consisting essentially of said lauroyl peroxide uniformly mixed with between about one and about nine times its weight of a dialkyl phthalate which is liquid at temperatures below about 40° C., and substantially inert to lauroyl peroxide, said paste being obtainable by heating a mixture of lauroyl peroxide and the selected proportioned amount of dialkyl phthalate of the group hereinbefore defined to a temperature above the melting point of the lauroyl peroxide but below about 70° C., until the lauroyl peroxide is completely melted, then cooling the agitated mixture to a temperature below 40° C.

6. A conditioned paste containing lauroyl peroxide from which the lauroyl peroxide is rapidly soluble in polymerizable polyester resins and monomers, consisting essentially of said lauroyl peroxide uniformly mixed with between about one and one-half and about three times its weight of dibutyl phthalate said paste being obtainable by heating a mixture of lauroyl peroxide and the proportioned amount of dibutyl phthalate to a temperature between about 60° C. and about 70° C. until the peroxide is completely melted, then cooling this agitated mixture to a temperature between 0° C. and 40° C.

7. A conditioned paste containing lauroyl peroxide from which paste the lauroyl peroxide is rapidly soluble in polymerizable polyester resins and monomers, consisting essentially of said lauroyl peroxide uniformly mixed with between about one and one-half and about three times its weight of dioctyl phthalate; said paste being obtainable by heating a mixture of lauroyl peroxide and the proportioned amount of dioctyl phthalate to a temperature between about 60° C. and about 70° C. until the peroxide is completely melted then cooling the agitated mixture to a temperature between 0° C. and 40° C.

8. A conditioned paste containing lauroyl peroxide from which paste the lauroyl peroxide is rapidly soluble in polymerizable polyester resins and monomers, consisting essentially of said lauroyl peroxide uniformly mixed with between about one and about nine times its weight of a completely esterified phosphate which contains esterifying members of the group consisting of alkyl, and mononuclear hydrocarbon aryl groups, is substantially inert towards lauroyl peroxide and is liquid at temperatures between 0° C. and 40° C., said paste being obtainable by heating a mixture of lauroyl peroxide and the selected proportioned amount of a completely esterified phosphate of the group hereinbefore defined to a temperature above the melting point of the lauroyl peroxide but below about 70° C. until the peroxide is completely melted, then cooling the agitated mixture to a temperature below 40° C.

9. A conditioned paste containing lauroyl peroxide from which the lauroyl peroxide is rapidly soluble in polymerizable polyester resins and monomers, consisting essentially of said lauroyl peroxide uniformly mixed with between about one and one-half and about three times its weight of tributylphosphate, said paste being obtainable by heating a mixture of the lauroyl peroxide and the proportioned amount of tributylphosphate to a temperature between about 60° C. and about 70° C. until the peroxide is completely melted, then cooling this agittated mixture to a temperature between 0° C. and 40° C.

10. A conditioned paste containing lauroyl peroxide from which the lauroyl peroxide is rapidly soluble in polymerizable polyester resins and monomers, consisting essentially of said lauroyl peroxide uniformly mixed with between about one and one-half and about three times its weight of a tricresyl phosphate which is liquid at temperatures below 40° C., said paste being obtainable by heating the mixture of lauroyl peroxide and the proportioned amount of tricresyl phosphate hereinbefore described to a temperature between about 60° C. and about 70° C. until the peroxide is completely melted, then cooling this agitated mixture to a temperature between 0° C. and 40° C.

11. A conditioned paste containing lauroyl peroxide from which the lauroyl peroxide is rapidly soluble in polymerizable polyester resins and monomers, consisting essentially of said lauroyl peroxide uniformly mixed with between about one and one-half, and about three times its weight of cresyldiphenyl phosphate, said paste being obtainable by heating a mixture of lauroyl peroxide and the proportioned amount of cresyldiphenyl phosphate to a temperature between about 60° C. and about 70° C. until the peroxide is completely melted, then cooling this agitated mixture to a temperature between 0° C. and 40° C.

References Cited in the file of this patent

UNITED STATES PATENTS

| | | |
|---|---|---|
| 2,549,732 | Weaver | Apr. 17, 1951 |
| 2,632,752 | Anderson | Mar. 24, 1953 |
| 2,779,702 | Wilson | Jan. 29, 1957 |

FOREIGN PATENTS

| | | |
|---|---|---|
| 522,868 | Belgium | Oct. 15, 1953 |